(12) United States Patent
Hannig

(10) Patent No.: US 11,648,661 B2
(45) Date of Patent: May 16, 2023

(54) PIVOTING UNIT FOR A HANDLING ROBOT AND ASSOCIATED METHOD

(71) Applicant: Dürr Systems AG, Bietigheim-Bissingen (DE)

(72) Inventor: Detlev Hannig, Winterbach (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 228 days.

(21) Appl. No.: 16/975,417

(22) PCT Filed: Mar. 1, 2019

(86) PCT No.: PCT/EP2019/055085
§ 371 (c)(1),
(2) Date: Aug. 25, 2020

(87) PCT Pub. No.: WO2019/170527
PCT Pub. Date: Sep. 12, 2019

(65) Prior Publication Data
US 2021/0001478 A1 Jan. 7, 2021

(30) Foreign Application Priority Data
Mar. 6, 2018 (DE) ...................... 10 2018 105 041.0

(51) Int. Cl.
*B25J 9/00* (2006.01)
*B25J 15/00* (2006.01)
(Continued)

(52) U.S. Cl.
CPC ......... *B25J 9/0084* (2013.01); *B25J 15/0052* (2013.01); *B05B 13/0452* (2013.01); *B25J 19/02* (2013.01)

(58) Field of Classification Search
None
See application file for complete search history.

(56) References Cited

U.S. PATENT DOCUMENTS 4,163,183 A * 7/1979 Engelberger .............. F16H 9/10
                                                         318/568.18
5,570,992 A * 11/1996 Lemelson .............. G05B 19/14
                                                         901/41
(Continued)

FOREIGN PATENT DOCUMENTS

CN         101861212 A      10/2010
CN         103171647 A       6/2013
(Continued)

OTHER PUBLICATIONS

International Search Report and Written Opinion for PCT/EP2019/055085 dated Jun. 6, 2019 (12 pages; with English translation).
(Continued)

*Primary Examiner* — Michael S Lowe
(74) *Attorney, Agent, or Firm* — Bejin Bieneman PLC

(57) ABSTRACT

The disclosure concerns a pivoting unit for a handling robot for opening a flap (e.g. door) of a motor vehicle body, comprising a mounting flange, a gripper arm and a first gripping tool for gripping an engagement on the flap to be opened, the first gripping tool being mounted on the gripper arm, and a pivoting head for pivoting the gripper arm between an initial position and an engaged position. The disclosure provides that a second gripping tool is also mounted on the gripper arm, and that the two gripping tools on the gripper arm are adapted to be inserted in different insertion directions into engagement with the openable flap of the motor vehicle body, in particular from top to bottom for the first gripping tool and from bottom to top for the second gripping tool. The disclosure further comprises an associated method.

10 Claims, 9 Drawing Sheets

(51) Int. Cl.
B05B 13/04 (2006.01)
B25J 19/02 (2006.01)

(56) References Cited

U.S. PATENT DOCUMENTS

| | | | | |
|---|---|---|---|---|
| 8,239,063 | B2* | 8/2012 | Clifford | B05B 13/0431 901/49 |
| 8,479,369 | B2* | 7/2013 | Sugimoto | B25J 19/023 29/714 |
| 2012/0163948 | A1 | 6/2012 | Asamizu et al. | |
| 2012/0260854 | A1* | 10/2012 | Takebe | B25J 9/0084 118/500 |
| 2017/0266808 | A1* | 9/2017 | Alonso | B25J 9/1612 |

FOREIGN PATENT DOCUMENTS

| | | |
|---|---|---|
| CN | 106409366 A | 2/2017 |
| DE | 102014017855 A1 | 6/2016 |
| EP | 2251252 A1 | 11/2010 |
| EP | 2497576 A1 | 9/2012 |
| JP | 2012139736 A | 7/2012 |

OTHER PUBLICATIONS

German Patent and Trademark Office Action for DE102018105041.0 dated Nov. 15, 2018 (3 pages).
Chinese Office Action and Search Report dated Feb. 20, 2023 in related application No. CN201980011133.X (28 pages; with English machine translation).

* cited by examiner

PIVOTING UNIT FOR A HANDLING ROBOT AND ASSOCIATED METHOD

CROSS-REFERENCE TO RELATED APPLICATIONS

This application is a national stage of, and claims priority to, Patent Cooperation Treaty Application No. PCT/EP2019/055085, filed on Mar. 1, 2019, which application claims priority to German Application No. DE 10 2018 105 041.0, filed on Mar. 6, 2018, which applications are hereby incorporated herein by reference in their entireties.

FIELD

The disclosure relates to a pivoting unit for a handling robot (e.g. door-opening robot) and a corresponding method for opening or closing a flap (e.g. door) of a motor vehicle body.

BACKGROUND

From DE 10 2014 017 855 A1 a door-opening robot is known which is used in a painting installation to open the doors of the motor vehicle bodies to be painted in the course of a painting process so that the interior of the motor vehicle bodies can also be painted. The well-known door-opening robot is designed as a SCARA robot (SCARA: Selective Compliance Assembly Robot Arm) and carries on a pivoting gripper arm as a gripping tool a tip gripper which can be inserted into an engagement (e.g. window gap, ring) of the door to be opened in order to grip the door for opening or closing. The gripping tool (e.g. tip gripper) is thus inserted from top to bottom into the engagement (e.g. ring, window gap) of the door. This makes the well-known door-opening robot, however, only suitable for opening or closing normal vehicle doors, whereas SCARA robots cannot be used to open or close sliding doors without further ado, but require 6-axis robots, which are much more complex and require a larger installation space.

US 2012/0163948 A1 shows a pivoting unit for mounting on a handling robot, which is used to open a flap of a vehicle body. The pivoting unit has a mounting flange for mounting the pivoting unit on the handling robot. Furthermore, it has a gripper arm with a first gripping tool and a second gripping tool which are designed to be inserted in different insertion directions into engagements on the flap of the motor vehicle body to be opened. However, this publication does not reveal a pivoting head for pivoting the gripper arm relative to the mounting flange.

DETAILED DESCRIPTION

Figure 1A:
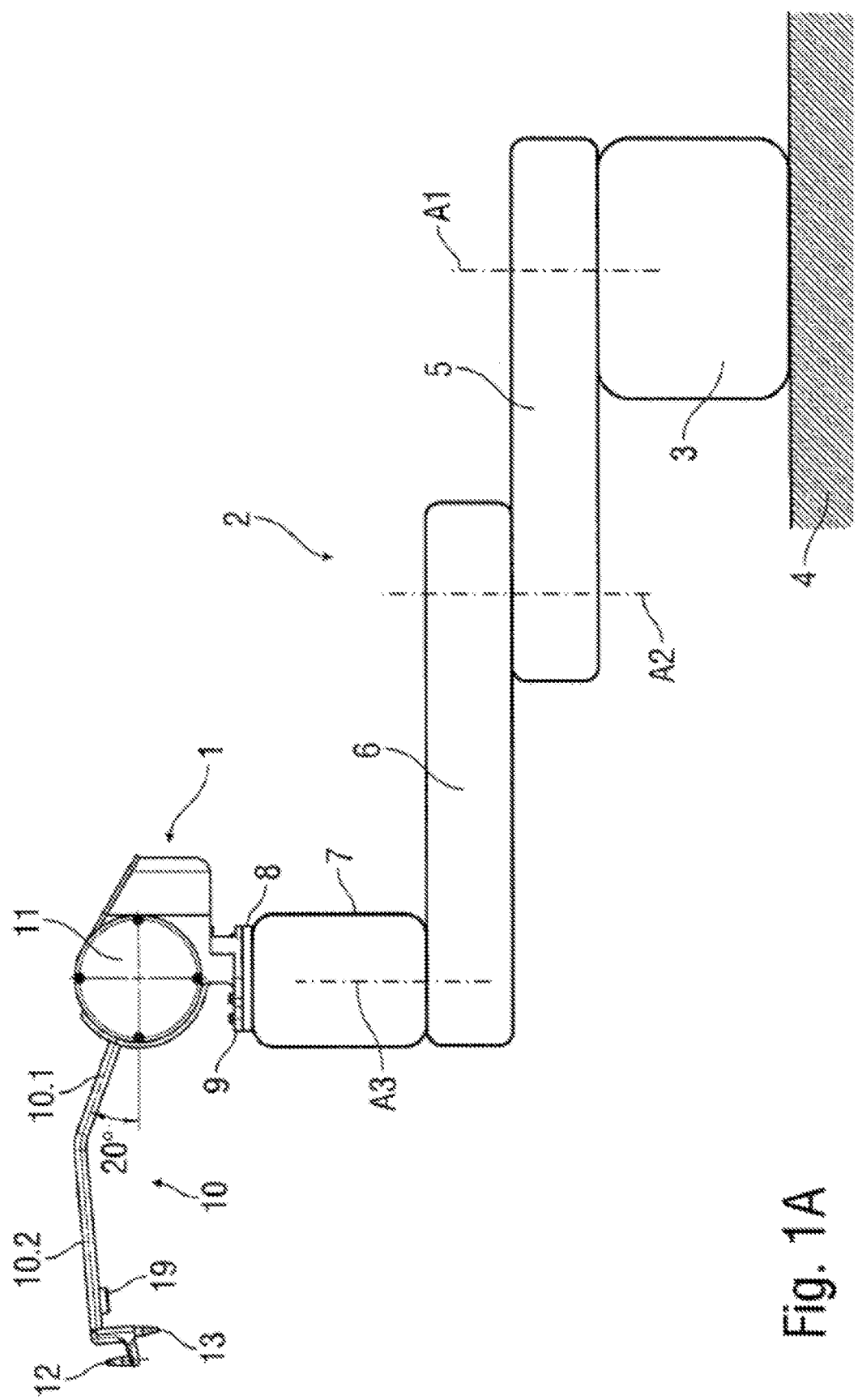
FIG. 1A a schematic diagram of a door-opening robot according to the disclosure.

The disclosure enables the use of SCARA robots for opening and closing sliding doors.

The disclosure initially provides for a pivoting unit which can be mounted on a handling robot (e.g. door-opening robot) for opening or closing a flap (e.g. door) of a motor vehicle body.

In accordance with the state of the art, the pivoting unit according to the disclosure first has a mounting flange with which the pivoting unit can be mounted on the handling robot (e.g. door-opening robot), for example by means of a screw connection. However, the term "mounting flange" used in the context of the disclosure is not limited to a plate-shaped mounting interface between the pivoting unit and the handling robot. The decisive factor is merely that the pivoting unit is guided by the handling robot. The pivoting unit can therefore also be structurally integrated into the handling robot.

In addition, the pivoting unit has a pivotable gripper arm, as is also the case with the well-known handling robot described above in accordance with DE 10 2014 017 855 A1.

In accordance with the state of the art, a first gripping tool (e.g. tip gripper) is attached to this gripper arm in order to grip an engagement (e.g. window gap, ring) on the flap (e.g. door) of the vehicle body to be opened so that the handling robot can open the flap. This first gripping tool is preferably located at the end of the gripper arm, but the first gripping tool can also be located at other points of the gripper arm.

Furthermore, the pivoting unit according to the disclosure comprises a pivoting head for pivoting the gripper arm with the first gripping tool relative to the mounting flange between a initial position and an engaged position. In the initial position, the first gripping tool does not engage in the engagement (e.g. ring, window gap) on the flap (e.g. door) of the motor vehicle body which is to be opened or closed. In the engaged position, however, the first gripping tool engages with the flap of the vehicle body to be opened or closed, so that the handling robot can open or close the flap.

The term "pivoting head" used in the context of the disclosure does not necessarily imply a head-shaped outer design of the pivoting head. Rather, the pivoting head is simply a pivoting joint which also contains other components in its housing.

In this respect, the pivoting head according to the disclosure corresponds to the pivoting unit of the known door-opening robot described at the beginning according to DE 10 2014 017 855 A1.

The pivoting unit according to the disclosure is now distinguished from the state of the art in that a second gripping tool (e.g. tip gripper) for gripping an engagement (e.g. ring) on the flap (e.g. door) of the motor vehicle body to be opened is also mounted on the gripper arm. Preferably, this second gripping tool is also arranged at the end of the gripper arm, however, other mounting locations on the gripper arm are also possible in principle.

The two gripping tools on the gripper arm are now designed in such a way that they are inserted in different insertion directions into the engagement on the opening flap (e.g. door) of the vehicle body. For example, the first gripping tool can be inserted in the conventional manner from top to bottom into an engagement (e.g. window gap) of an opening door. The second gripping tool can then be inserted, for example, from bottom to top into the engagement (e.g. ring) on the flap to be opened (e.g. door). The two gripping tools thus differ in different and preferably opposite insertion directions with respect to the engagement on the flap to be opened (e.g. door). This makes a handling robot with the pivoting unit of the disclosure suitable both for opening conventional vehicle doors and for opening sliding doors of vehicle bodies.

It has already been briefly mentioned above that the two gripping tools can be tip grippers which protrude from the gripper arm in opposite directions, for example upwards or downwards. Such tip grippers are known from DE 10 2014 017 855 A1, also published at US Patent Application Publication 2017/026,6808 A1 which is incorporated herein by reference, and therefore need not be described in detail. It is only necessary to mention at this point that the tip grippers are preferably thorn- or pin-shaped in order to be able to be inserted into the engagement (e.g. window gap, ring) on the flap to be opened (e.g. door).

In a preferred embodiment of the disclosure, the pivoting head has a pivoting drive to pivot the gripper arm. For example, this pivoting drive can have a pneumatic cylinder. However, it is also possible that the pivoting drive has an electric motor or a hydraulic cylinder.

In addition, the pivoting head of the pivoting unit according to the disclosure preferably comprises at least one limit switch, which switches at an end position of the pivoting drive of the gripper arm in order to provide position feedback. For example, one limit switch can be provided for each of the two end positions of the pivoting drive of the gripper arm.

Furthermore, the pivoting head can have a rotary encoder (e.g. potentiometer) to determine the pivoting position of the gripper arm.

In addition, the pivoting head can have a force transducer which measures the counter force acting on the gripper arm. On the one hand, this enables collision detection if the counterforce acting on the gripper arm suddenly increases. On the other hand, this also enables detection of whether the gripping tool has gripped the flap to be opened (e.g. door). Preferably, this force transducer enables force measurement in both pivot directions, i.e. for both gripping tools that are inserted into the corresponding engagement in different directions.

Furthermore, within the scope of the disclosure it is possible that the pivoting unit has an integrated position sensor to detect the position of the gripper arm and the gripping tools relative to the engagement at the flap to be opened. Such position sensors are known per se from DE 10 2014 017 855 A1 and therefore need not be described in detail. At this point it is only necessary to mention briefly that the position sensor can be an ultrasonic sensor or an inductive sensor, for example.

It should also be mentioned that the pivoting head allows a certain pivoting angle of the gripper arm, whereby the pivoting angle is preferably at least 5°, 10° or 15°.

It should also be mentioned that the gripper arm preferably has a proximal upper arm and a distal lower arm which are angled towards each other. For example, the proximal upper arm and the distal lower arm can include an angle of 2°-25°, 5°-20° or 5°-15° with their longitudinal axes. However, within the scope of the disclosure, it is alternatively also possible that the gripper arm is not curved, as is also shown for example in DE 10 2014 017 855 A1.

It should also be mentioned that the disclosure does not only claim protection for the pivoting unit according to the disclosure described above as a single assembly. Rather, the disclosure also claims protection for a complete handling robot (e.g. door-opening robot) with such a pivoting unit.

The handling robot according to the disclosure is preferably designed as a SCARA robot, as is known per se from conventional door-opening robots and is described, for example, in DE 10 2014 017 855 A1. This is advantageous because SCARA robots are less complex than 6-axis robots and require less installation space.

The handling robot according to the disclosure can additionally have a vertical travel axis in order to move the complete pivoting unit in a vertical direction. This can be useful, for example, if the gripper arm with the mounted gripper tools is to be inserted from top to bottom into a cleaning device. This pivoting unit with one travel axis can be integrated either in a Scara robot or in a handling robot.

Furthermore, the disclosure also claims protection for a complete coating installation (e.g. paint shop) for coating (e.g. painting) motor vehicle bodies, wherein this coating installation according to the disclosure comprises at least one handling robot according to the disclosure as described above.

The coating installation according to the disclosure may additionally comprise a cleaning device for cleaning the gripping tools from time to time. For this purpose, the gripper arm with the gripping tools mounted therein can be inserted into the cleaning device through an insertion opening of the cleaning device. The actual cleaning can then be carried out inside the cleaning device, for example by applying a flow of flushing agent and pulsed air to the gripping tools. This is preferably done by using the Z-axis of the Scara robot.

Finally, the disclosure also claims protection for a corresponding method for opening and closing flaps (e.g. doors) of motor vehicle bodies in a painting installation.

Within the scope of the method according to the disclosure, the type of the respective engagement of the door to be opened is first determined. For example, the engagement may be a ring, a window gap or the inside of the door to be opened. Furthermore, the type of door is determined within the scope of the method according to the disclosure. For example, the door to be opened may be a conventional swing door or a sliding door with an assembly hinge.

Depending on the type of engagement, the appropriate insertion direction and the appropriate gripping tool are then selected.

For example, if the engagement is a conventional ring on a swing door of a car body, the downward projecting tip gripper is selected and inserted into the ring from top to bottom to grip the door.

The same applies if the engagement is a window gap of a swing door or sliding door or the inside of a sliding door or a ring on a sliding door or sliding door with a spare hinge.

However, if the engagement is a ring on a sliding door, the top-tip gripper is selected and inserted into the ring from bottom to top.

The type of the respective engagement can be read out from the paint shop control system, for example, within the scope of the method according to the disclosure. Alternatively, the type of the respective engagement can be recorded by a camera.

Furthermore, within the scope of the method according to the disclosure, it can be provided that the gripper arm with the gripping tools is inserted into a cleaning device in order to clean the gripping tools. For this purpose, an additional vertical travel axis can be integrated into the pivoting unit or into the SCARA robot.

With reference to the drawings, wherein like elements are numbered alike, there is shown a door-opening robot 2 which is designed as a SCARA robot (SCARA: Selective Compliance Assembly Robot Arm) and initially has a robot base 3, which can, for example, be mounted on a cabin floor 4 of a paint booth.

In addition, the door-opening robot 2 has a proximal robot arm 5 and a distal robot arm 6, both of which can be rotated about vertical axes of rotation A1 and A2 relative to the robot base 4 and relative to the proximal robot arm 5.

At the end of the distal robot arm 6, a superstructure 7 is arranged on the top side, which can be rotated about a vertical axis of rotation A3 relative to the distal robot arm 6 and has a mounting flange 8 on its top side.

The pivoting unit 1 also initially has a mounting flange 9, which is screwed to the mounting flange 8 of the door-opening robot 2.

In addition, the pivoting unit 1 has a gripper arm 10, which can be swivelled in the drawing plane relative to the mounting flange 8 by means of a pivoting head 11.

The gripper arm 10 has a proximal upper arm 10.1 and a distal lower arm 10.2, which are angled relative to each other.

At the end of the gripper arm 10 there are two gripping tools 12, 13 in the form of tip grippers, with the gripping tool 12 projecting upwards and the gripping tool 13 projecting downwards.

Figure 2A:
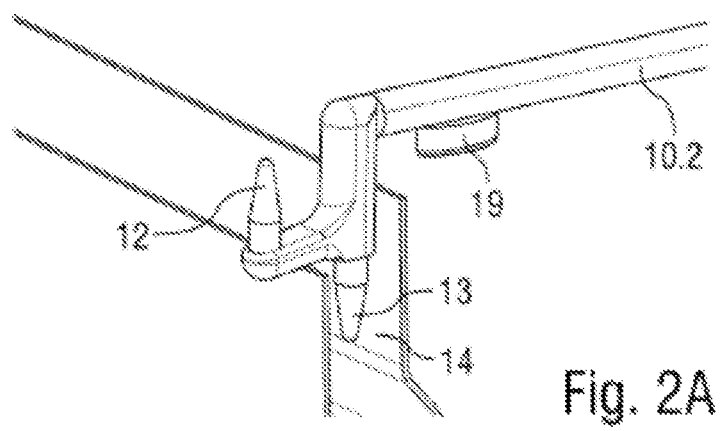
Figure 2B:
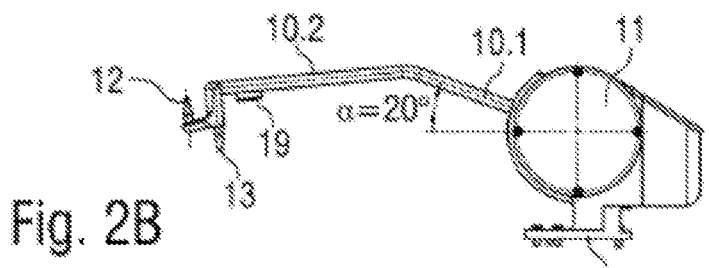
Figure 2C:
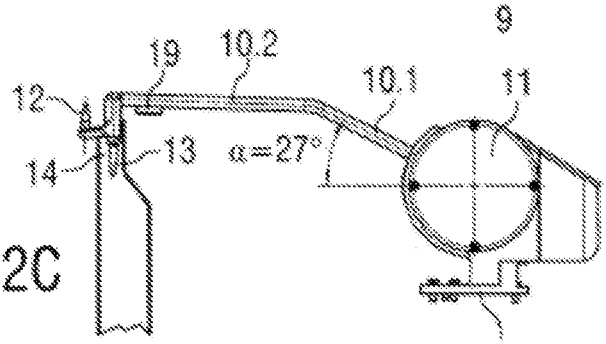
Figure 2D:
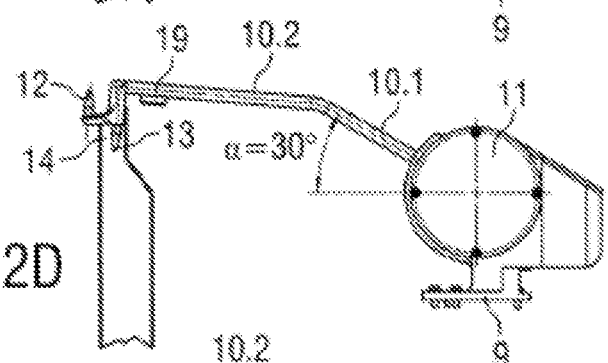
Figure 2E:
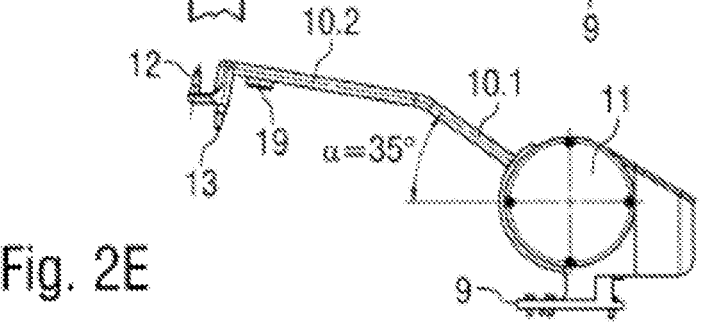
Figure 3A:
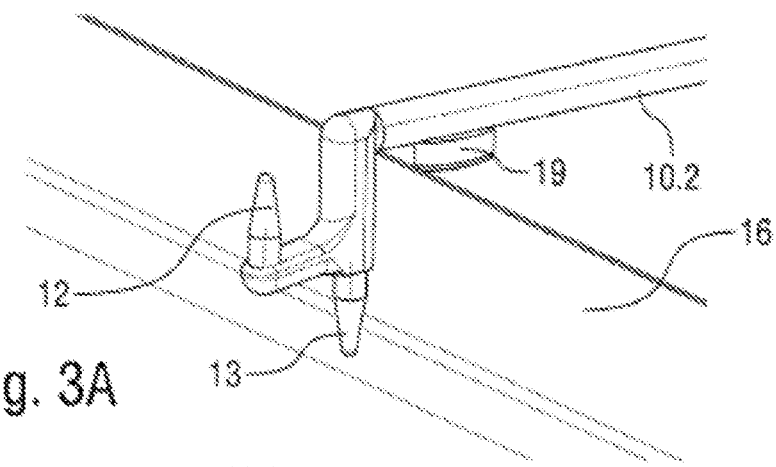
Figure 3B:
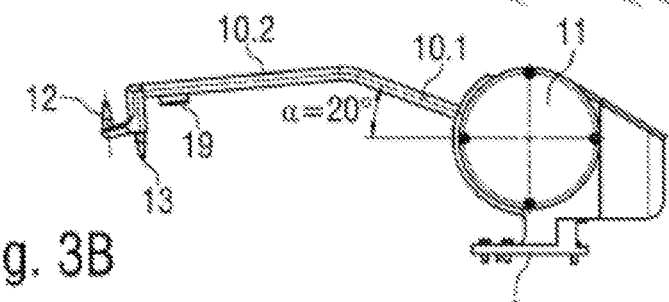
Figure 3C:
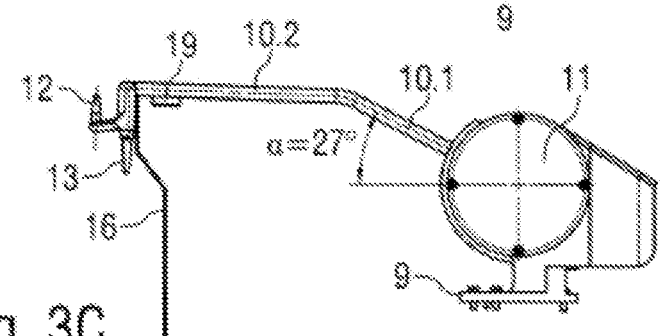
Figure 3D:
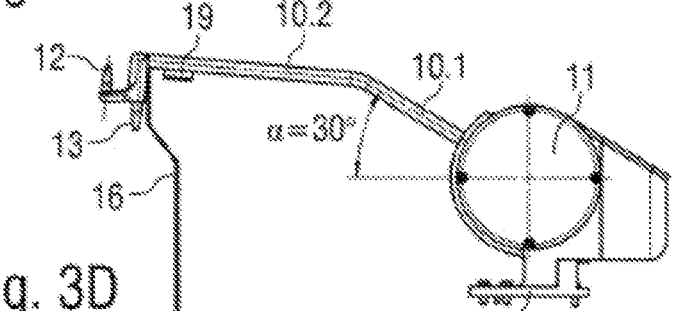
Figure 3E:
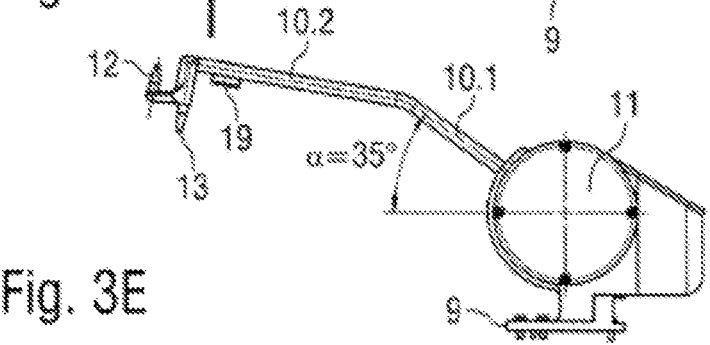

The lower gripping tool 13 is used here to engage in a window gap 14 (see FIG. 2A), in a ring 15 (see FIG. 1B) or on the inside 16 (see FIG. 3A) of a door, whereby the lower gripping tool 13 is inserted from top to bottom, as described in detail below.

Figure 4A:
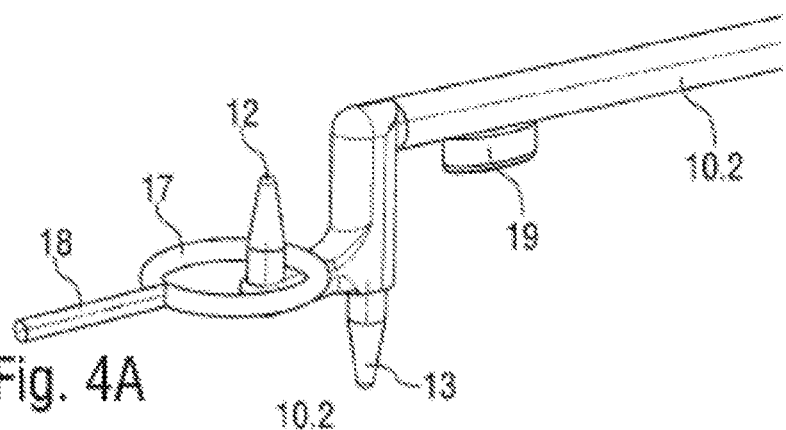
Figure 4B:
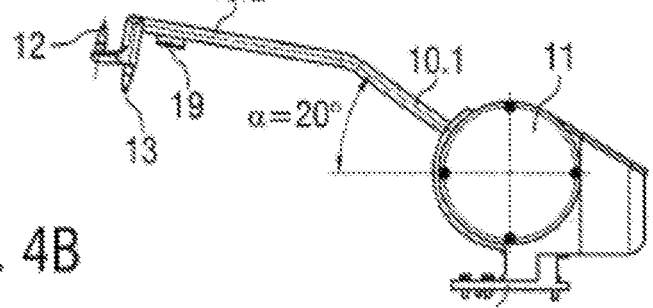
Figure 4C:
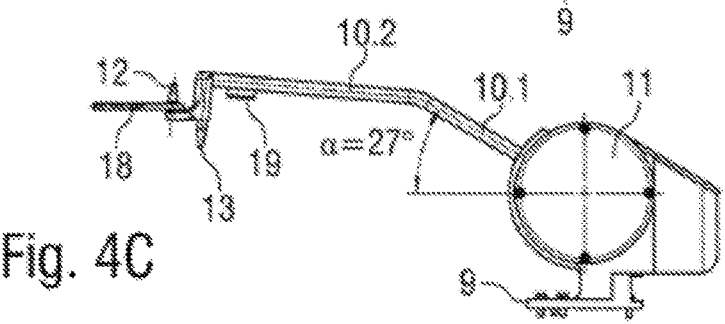
Figure 4D:
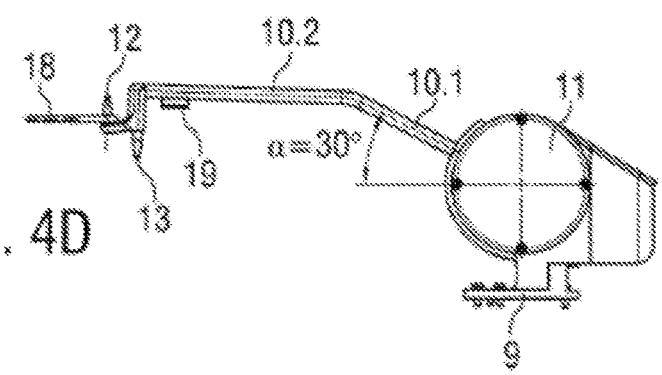
Figure 4E:
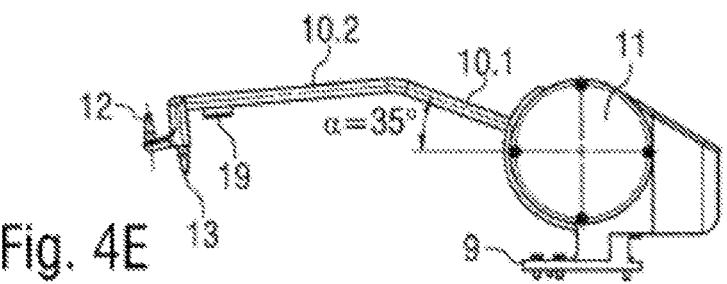

The upper gripping tool 12, on the other hand, is used in a new way for insertion into a ring 17 (see FIG. 4A), which is connected to a sliding door by means of a ring rod 18, whereby the upper gripping tool 12 is inserted into the ring 17 from bottom to top.

On the distal lower arm 10.2 of the gripper arm 10 there is a position sensor 19 on the underside, which has the task of detecting the positioning of the gripping tools 12, 13 in relation to the respective engagement, so that the gripping tools 12 or 13 can be inserted in the correct position. The position sensor 19 is basically known from DE 10 2014 017 855 A1, so that reference is made to this patent publication with regard to the design and function of the position sensor 19 in order to avoid repetition.

Figure 1B:
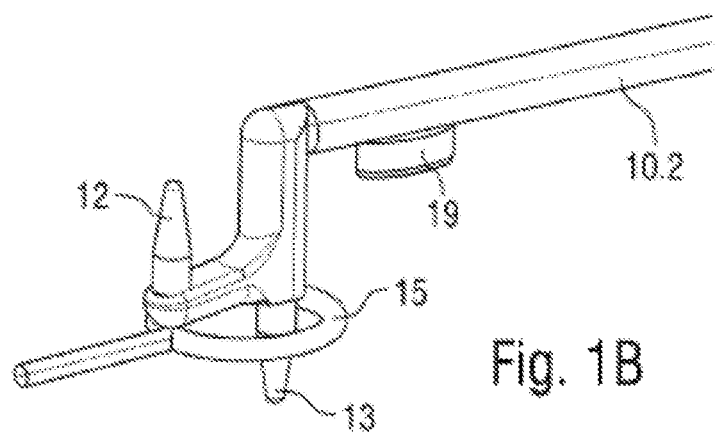
FIG. 1B is a perspective view of the gripper arm with the gripping tools on the door-opening robot shown in FIG. 1A, FIGS. 1C to 1F different positions of the pivoting unit of the door-opening robot according to FIG. 1A, FIGS. 2A to 2E modifications of FIGS. 1B to 1F with a window gap as an engagement on an opening door of a motor vehicle body, FIGS. 3A to 3E modifications of FIGS. 2A to 2E, where the engagement on the opening door is formed by the inside of the opening door, FIGS. 4A to 4E modifications of FIGS. 2A to 2E, where a ring on a sliding door is provided as an engagement and the gripping tool is inserted into the ring from below.

FIG. 1B shows an engaged position in which the lower gripping tool 13 is inserted into the ring 15.

Figure 1C:
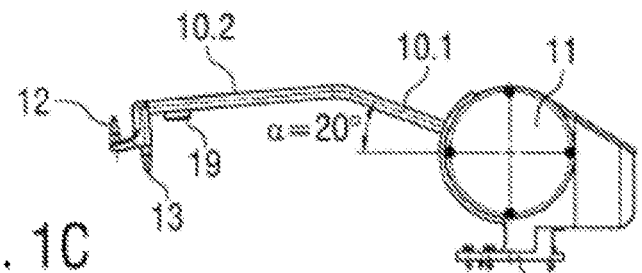

FIGS. 1C to 1F show different pivoting positions of the gripper arm 10, FIG. 1C shows a initial position with a stop of a locking cylinder at a pivoting angle α=20°.

Figure 1D:
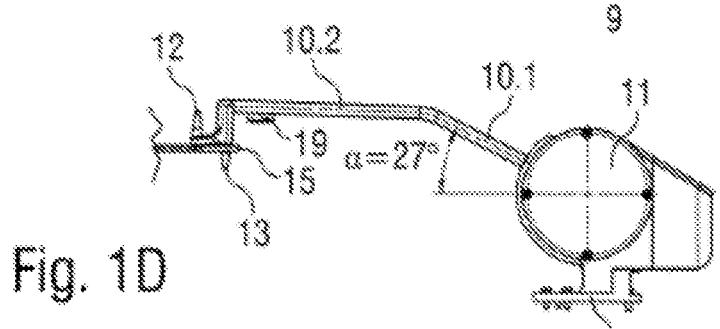

FIG. 1D, on the other hand, shows a working position (engaged position) with a pivoting angle α=27°, where a signal is sent to a control unit indicating that the door is gripped.

Figure 1E:
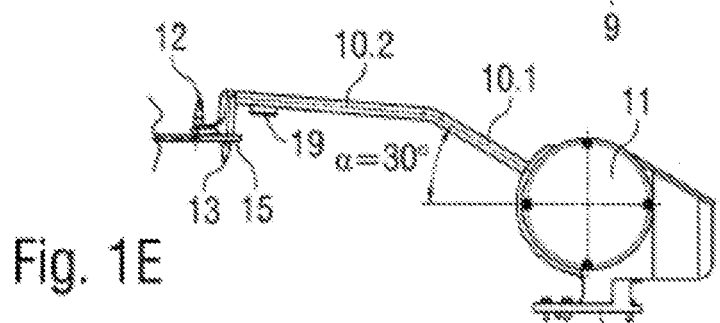

FIG. 1E shows an overload position with an angle α=30°. In this overload position, a signal is sent to a higher-level control system indicating that an overload has occurred.

Figure 1F:
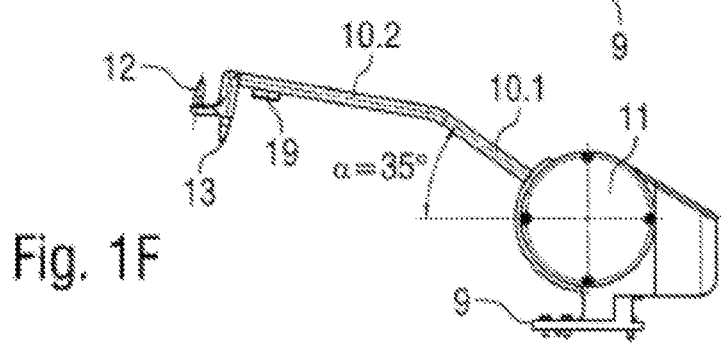

Finally, FIG. 1F shows an end position with an angle of α=35°, and in this end position a signal is also sent to a higher level control.

FIGS. 2A to 2E show variations of FIGS. 1B to 1F, so to avoid repetition, reference is made to the above description, using the same reference signs for details.

A special feature of this embodiment is that the engagement for the lower gripping tool 13 is not formed by ring 15, but by the window gap 14.

FIGS. 3A to 3E again show variations of FIGS. 2A to 2E, so that to avoid repetition, reference is made to the above description, using the same reference signs for the corresponding details.

A feature of this embodiment is that the engagement is formed by an inner side 16 of the door to be opened. Here too, however, the lower gripping tool 13 is inserted into the engagement from top to bottom, i.e. to the inner side 16 of the door.

FIGS. 4A to 4E again show variations of FIGS. 2A to 2E, so that reference is made to the above description to avoid repetition.

A feature of this embodiment is that the upper gripping tool 12 is inserted from bottom to top into ring 17, which is connected to the sliding door by the ring rod 18.

Figure 5A:
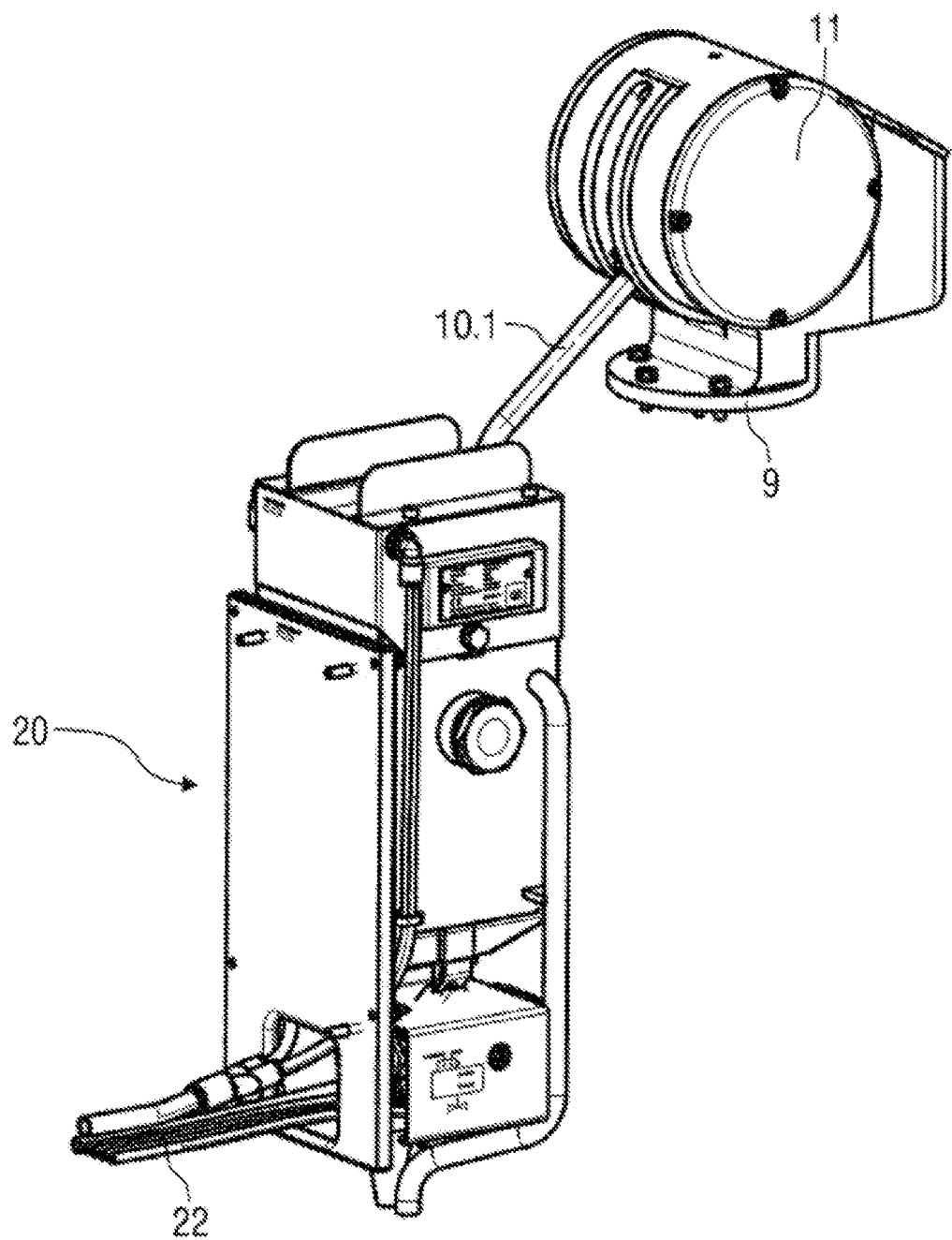
FIG. 5A is a perspective view of the pivoting unit with a cleaning device, FIG. 5B a partially cut open side view of FIG. 5A, FIG. 5C a detail enlargement from FIG. 5B, FIG. 5D a view of the cleaning device and the pivoting unit as shown in FIGS. 5A to 5C, and FIG. 6 the method according to the disclosure in the form of a flowchart.

FIG. 5A also shows a cleaning device 20 for cleaning the gripping tools 12, 13 on the gripper arm 10.

Figure 5B:
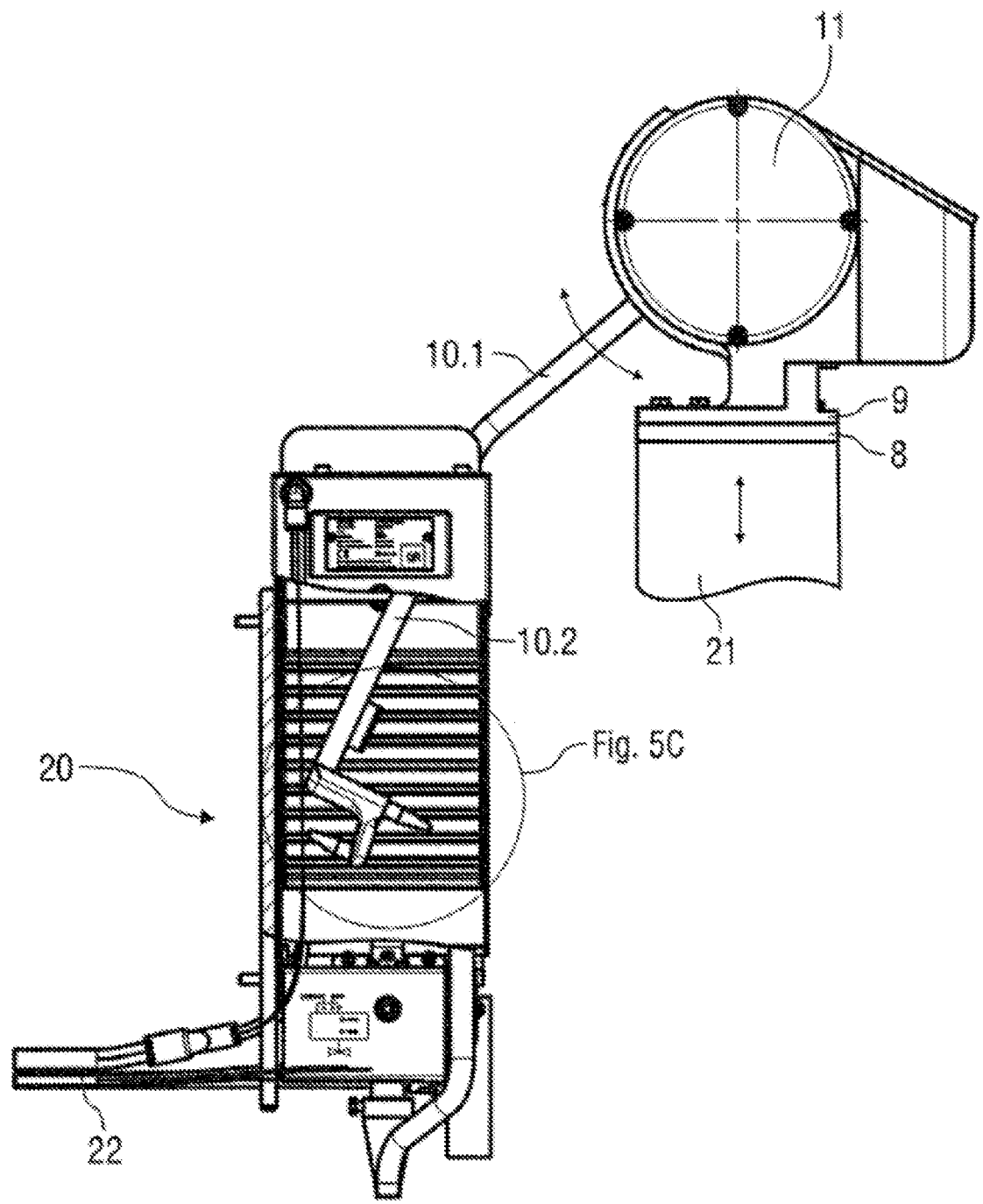
Figure 5C:
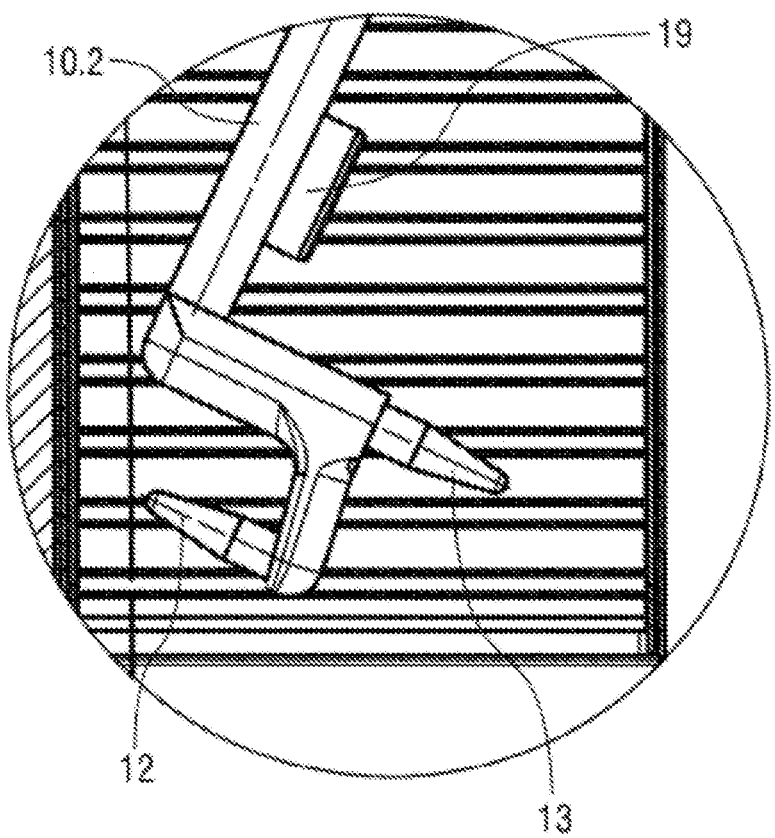
Figure 5D:
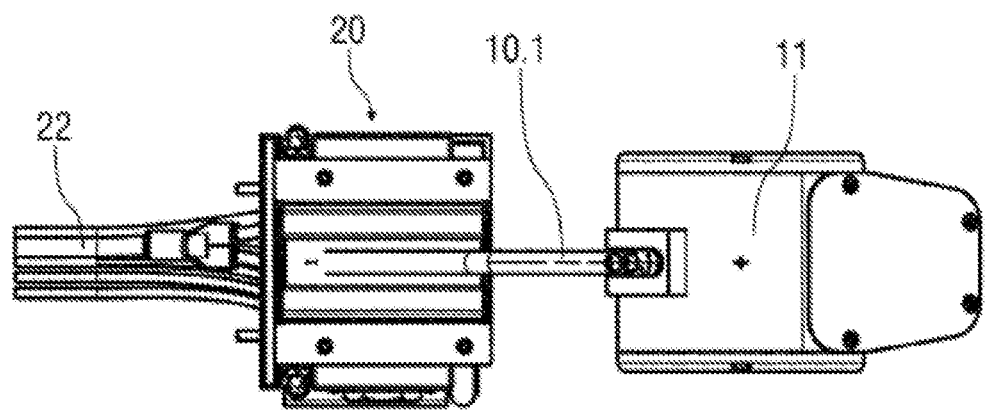

For this purpose the gripper arm 10 is pivoted downwards by the pivoting head as shown in FIGS. 5A and 5B.

Then the pivoting unit 1 is moved vertically downwards by means of a travel axis 21 until the gripping tools 12, 13 are inside the cleaning device 20, as shown in FIG. 5B.

The cleaning unit 20 has connection lines 22, which can be used to supply, for example, pulsed air and flushing agent for cleaning the gripping tools 12, 13.

Figure 6:
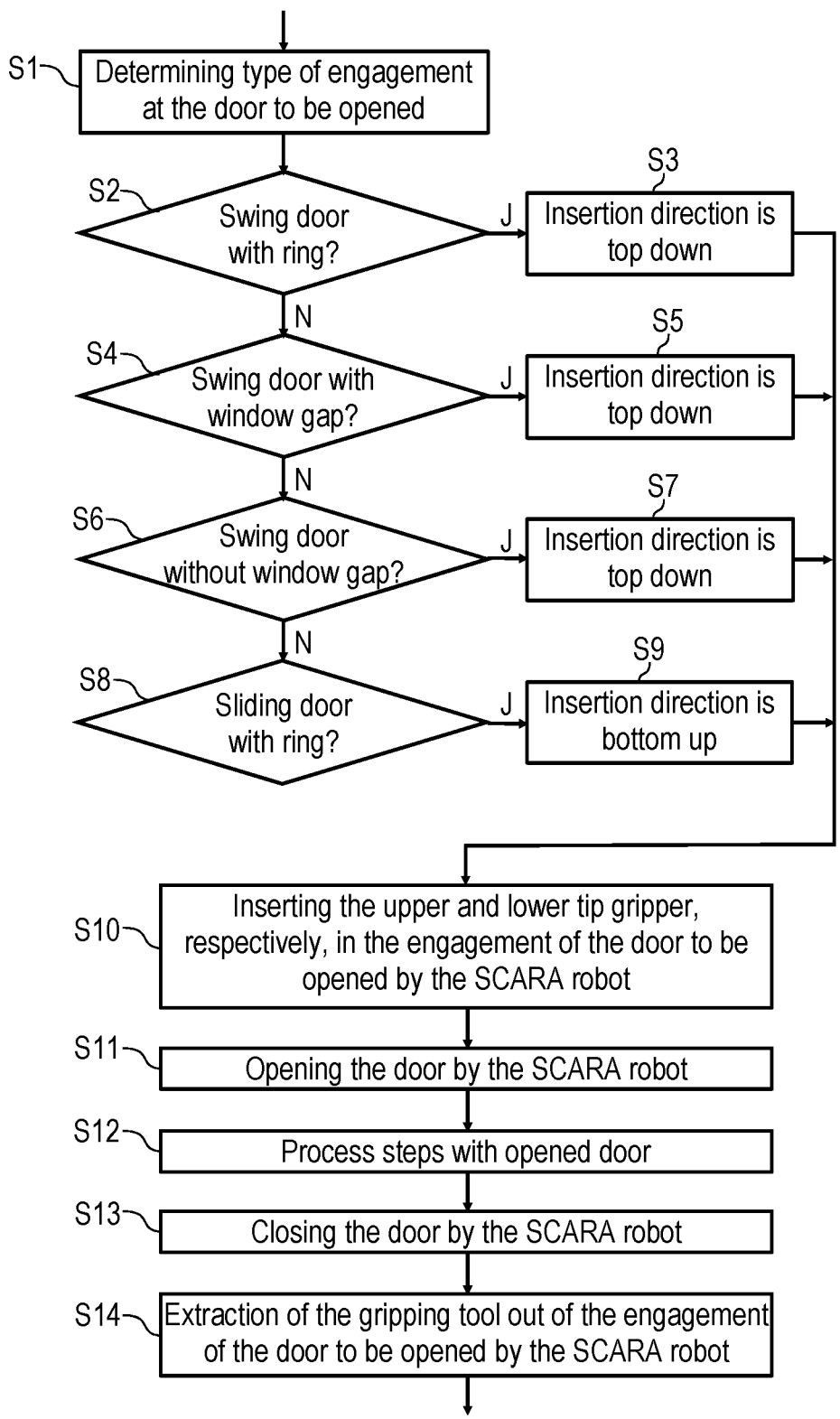

In the following, the method according to the flow chart in FIG. 6 is explained.

In a first step S1, the type of engagement on the door to be opened is first determined.

If it is a conventional swing door with a ring 15, then in a step S2 a branch is made to a step S3, in which it is determined that the direction of insertion for the gripping tools is from top to bottom. In addition, the lower gripper tool 13 is also selected in step S3.

Otherwise, a check is made in step S4 to determine whether the engagement is the window gap 14 on the conventional swing door.

If this is the case, in a step S5 it is determined that the lower gripping tool 13 is selected and then inserted into the window gap 14 from top to bottom.

Otherwise, in a step S6 it is checked whether it is a swing door without a window gap.

If this is the case, in a step S7 it is determined that the direction of insertion is from top to bottom and the inside 16 of the door to be opened is used as the engagement.

Otherwise, in a step S8 it is checked whether the door to be opened is a sliding door with the ring 17.

If this is the case, in a step S9 it is determined that the insertion direction is from bottom to top, whereby the upper gripping tool 12 is selected.

In a next step S10, the selected gripping tool 12 or 13 is then inserted in the selected insertion direction into the engagement of the door to be opened.

The door is then opened in a step S11.

When the door is open, further work steps can be carried out in step S12, such as painting the interior of the vehicle body.

The door is then closed again in step S13.

Finally, the respective gripping tool 12 or 13 is then pulled out of the engagement again in step S14.

The disclosure is not limited to the preferred embodiments described above. Rather, the disclosure also includes variations and modifications which also make use of the inventive idea and therefore fall within the scope of protection.

The invention claimed is:

1. A pivoting unit adapted for mounting on a handling robot for opening and closing a flap of a motor vehicle body, said pivoting unit comprising:
   a) a mounting flange for mounting the pivoting unit on the handling robot,
   b) a gripper arm,
   c) a first gripping tool for gripping an engagement on the openable flap of the motor vehicle body, wherein the first gripping tool is mounted on the gripper arm, and
   d) a pivoting head for pivoting the gripper arm with the first gripping tool relative to the mounting flange between
      d1) an initial position in which the first gripping tool does not engage in the engagement on the flap of the motor vehicle body to be opened or closed, and
      d2) an engagement position in which the first gripping tool engages in the engagement on the flap of the motor vehicle body which can be opened or closed,
   e) wherein a second gripping tool for gripping an engagement on the openable flap of the motor vehicle body is also mounted on the gripper arm, and
   f) wherein the two gripping tools on the gripper arm are designed to be inserted in different insertion directions into the engagement on the openable flap of the motor vehicle body, with the first gripping tool of the two gripping tools projecting upward and the second gripping tool projecting downward.

2. The pivoting unit according to claim 1, wherein the two gripping tools are designed as tip grippers and project in opposite directions parallel to each other from the gripper arm.

3. The pivoting unit according to claim 1, wherein the pivoting head for pivoting the gripper arm has a pivoting drive.

4. The pivoting unit according to claim 1, wherein the pivoting head has at least one limit switch for determining the pivoting position, which switches at an end position of the pivoting range.

5. The pivoting unit according to claim 1, wherein the pivoting head has a rotary encoder for determining the pivoting position.

6. The pivoting unit according to claim 1, wherein the pivoting head has a force transducer which measures the counter force acting on the gripper arm in both pivoting directions.

7. The pivoting unit according to claim 1, wherein a position sensor is mounted on the gripper arm for detecting the position of the gripper arm relative to the engagement on the flap of the motor vehicle body which is to be opened.

8. The pivoting unit according to claim 1, wherein the pivoting head permits a pivoting angle of at least 5°.

9. The pivoting unit according to claim 1, wherein the gripper arm has a proximal upper arm and a distal lower arm which are angled relative to each other.

10. The pivoting unit according to claim 1, wherein the second gripping tool is between the first gripping tool and the pivoting head.

* * * * *